Oct. 24, 1961  R. D. MAY  3,005,523
DAMPING DASHPOT
Filed Oct. 6, 1959  2 Sheets-Sheet 1
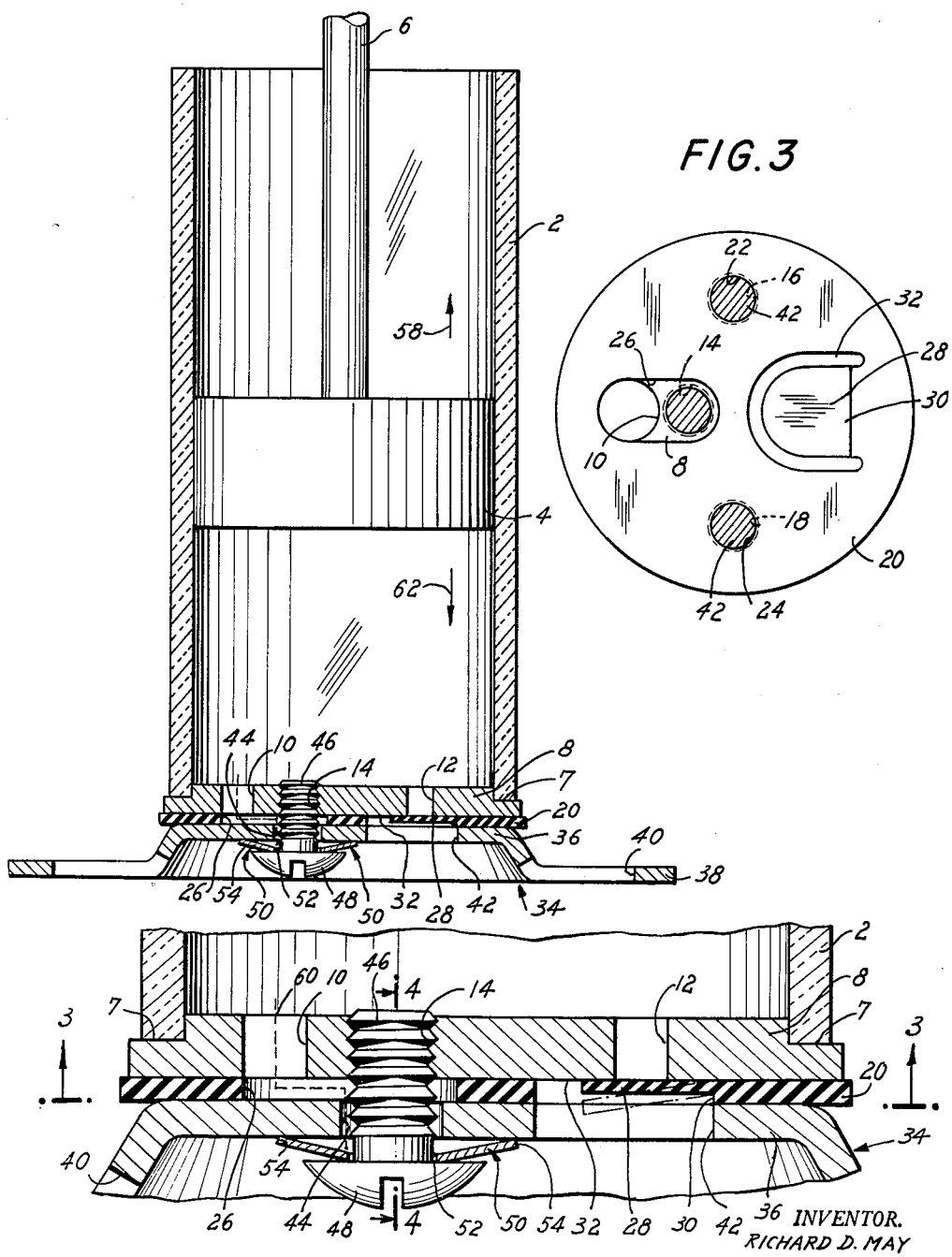
INVENTOR.
RICHARD D. MAY
BY
James and Franklin
ATTORNEYS Oct. 24, 1961 R. D. MAY 3,005,523
DAMPING DASHPOT
Filed Oct. 6, 1959 2 Sheets-Sheet 2
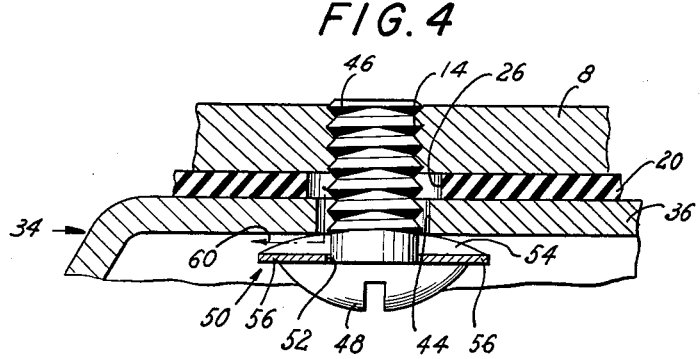
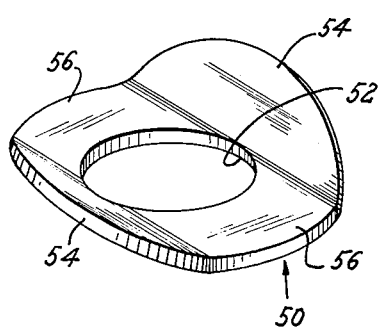
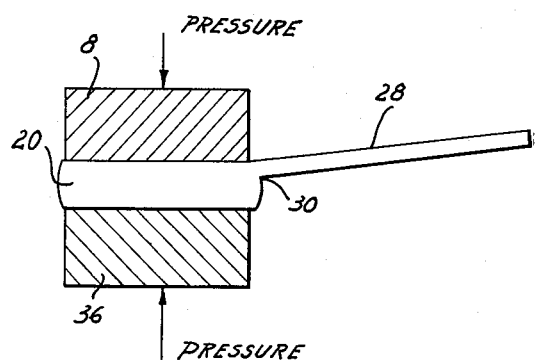
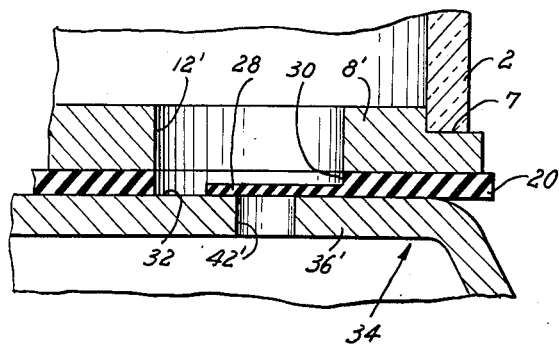
INVENTOR.
RICHARD D. MAY
BY James and Franklin
ATTORNEYS

United States Patent Office 3,005,523
Patented Oct. 24, 1961

3,005,523
DAMPING DASHPOT
Richard D. May, Westport, Conn., assignor to Electric Regulator Corporation, Norwalk, Conn., a corporation of New York
Filed Oct. 6, 1959, Ser. No. 844,758
13 Claims. (Cl. 188—95)

The present invention relates to the construction of a piston-cylinder combination in the nature of a dashpot which provides an adjustable degree of damping upon moving of the piston thereof in either or both directions.

The demand for damping dashpots is widespread. Such devices are employed for damping the movement of structural elements of substantial size, for example, doors and windows, and also for damping the movement of small elements used in control devices, such as electromagnet armatures. Indeed, in closed-loop control systems an adjustable damping means is often a prerequisite to proper functioning of the control loop.

The structure of the present invention, while not limited to use in the damping of small structural elements, is nevertheless specially adapted for use therewith. It is particularly well adapted, by reason of its simplicity of construction, for use in applications where large numbers of devices are required and where cost is a factor. Specially noteworthy is the fact that effective and accurately adjustable control of the degree of damping for either or both directions of movement of the piston is provided by means of structure which is readily formed of fabricated parts which (except for the piston and cylinder itself) need not be manufactured to any appreciable degree of dimensional tolerances and which may be assembled very simply.

In order to provide for adjustment of the degree of damping it is customary to provide a throttling fluid passage between the interior and exterior of the cylinder, the effective size of which passage can be varied. Adjustable needle valves are often used for this purpose, but they are relatively expensive and require at least a moderate degree of precision in their manufacture. In accordance with the present invention that portion of the throttling passage the size of which is to be adjusted is defined in part by a resilient member, here shown as a bowed stock washer, which is interposed between the head of an adjusting screw and the body of the dashpot. Threaded adjustment of the screw causes the bowed portion of the washer to move toward and away from the dashpot body, thus varying the effective size of the damping passage.

When damping is desired in both directions of movement of the piston this throttling passage is the only one provided. However, when damping is desired for only one direction of the movement of the piston, movement of the piston in the other direction being relatively unrestrained, an additional fluid passage is provided between the interior of the cylinder and the exterior thereof, and a check valve of novel design is cooperatively associated therewith. This check valve is in the form of a flap formed integral with a sheet of appropriate material and movable between an operative position covering and closing the second fluid passage and an inoperative position exposing that passage, the flap being so oriented relative to the passage as to assume one or the other of its designed positions depending upon the direction in which the piston is moved.

Flap-type valves of this general nature have been known. They have suffered from the grave disadvantage, however, of not being reliably pre-loaded toward their operative passage-closing position. They move fully to that position only in response to a flow of air in an appropriate direction induced by the piston movement, and consequently an appreciable portion of the initial movement of the piston is undamped or inadequately damped. To provide external spring loading for the flap is possible, but greatly increases the complexity and cost of the unit.

I have discovered that if the flap has a thickness less than that of the member from which it is formed and if the body of the member adjacent to the flap is compressed, the flap will be inherently urged to a position out of the plane of the body of the member and hence will be pre-loaded to its passage-closing position when appropriately oriented relative to the cylinder structure.

To the accomplishment of the above, and to such other objects as may hereinafter appear, the present invention relates to the construction of a damping dashpot as defined in the attended claims, and as described in this specification, taken together with the accompanying drawings, in which:

FIG. 1 is a vertical cross sectional view of one embodiment of the present invention in which the parts are arranged to provide for damping when the piston is lifted and for relatively free movement of the piston in a downward direction;

FIG. 2 is a cross sectional view on an enlarged scale of the lower portion of the dashpot cylinder of FIG. 1, the flap valve being shown in solid lines in its passage-closing position and in broken lines in its passage-opening position;

FIG. 3 is a view taken along the line 3—3 of FIG. 2;

FIG. 4 is a fragmentary cross sectional view taken along the line 4—4 of FIG. 2;

FIG. 5 is a three-quarter perspective view of the spring washer which forms a part of the damping adjustment construction;

FIG. 6 is a schematic view illustrating the manner in which pre-loading or biasing of the flap valve is achieved; and FIG. 7 is a fragmentary cross sectional view of the flap valve and associated parts arranged and constructed to provide for damping when the piston is lowered and for relatively free movement of the piston in an upward direction.

The dashpot of the present invention as here specifically disclosed comprises a cylinder 2 which may be formed of glass tubing, the internal diameter of which is accurately dimensioned, within which a piston 4 is slidable in sealing relation to the inner surface thereto. The piston 4 is provided with a piston rod 6 attached thereto which extends up through the open top of the cylinder 2 and adapted to be connected, in any appropriate manner, with the element or elements movement of which is to be damped.

The lower end of the cylinder 2 is sealingly received within the recess 7 formed on the periphery of a base plate 8 which completely closes the bottom of the cylinder 2. The cylinder 2 and base plate 8 are permanently secured together in any suitable manner, as through the use of an appropriate cement. In the form shown in FIGS. 1–4 the base plate 8 is provided with a pair of separated apertures 10 and 12, and with internal tapped apertures 14, 16 and 18.

Positioned below the base plate 8 and against the lower surface thereof is a member 20 preferably formed of a compressible material such as silicone rubber. This member is provided with apertures 22 and 24 which register with the base plate apertures 16 and 18 respectively, with an elongated slot 26 which registers with the base plate aperture 10 and extends laterally therebeyond, and with a flap 28 connected to the body of the member 20 along one end 30 and separated from the body 20 along the sides and free end thereof with a substantial clearance 32. As may best be seen from FIGS. 1 and 2, the thickness of the flap 28 is appreciably less than the thickness of the body proper 20, and may be as little as one-third the thickness of the body 20.

The base plate 8, with the member 20 on the under surface thereof, is secured atop the bracket generally designated 34, that bracket having a top wall 36 on which the member 20 rests and which is raised above an outwardly projecting flange 38 which may be provided with holes 40 through which mounting screws or the like may pass. Screws 42 pass through properly positioned apertures (not shown) in the top bracket wall 36 and through the apertures 22 and 24 in the body 20 and are threadedly received in the tapped apertures 16 and 18 in the base plate 8 (see FIG. 3), thus securing the parts 8, 20 and 36 together and compressing the member 20 between the parts 8 and 36. The bracket wall 36, in the form shown in FIGS. 1-4, is provided with an elongated aperture 42 located beneath and larger than the flap 28, and with aperture 44 in registration with but larger than the aperture 14 in the base plate 8. A damping adjustment screw 46 is threadedly received in the base plate aperture 14, its shank extends through the slot 26 in the member 20 and the aperture 44 in the bracket wall 36 with appreciable clearance therearound, and the screw head 48 is located below the bracket wall 36. Interposed between the screw head 48 and the lower surface of the bracket wall 36 is a resilient metal washer 50 having a central opening 52 through which the shank of the screw 46 extends. This washer is bowed about one diameter thereof, as may perhaps best be seen from FIG. 5, so as to comprise downwardly bent wings 54 along two sides thereof and flat wings 56 along the other two sides thereof. The tips of the wings 54 will engage the under surface of the bracket wall 36. The tips of the wings 56 will normally be spaced below the under surface of the bracket wall 36.

By virtue of the fact that the flap 28 is of lesser thickness than the body of the member 20, any compressive force exerted on the body of the member 20 adjacent the flap 28 will, as indicated schematically in FIG. 6, cause the flap 28 to swing upwardly away from that portion of the thickness of the body 20 which does not continue into the flap 28. Hence, when the member 20 is located as shown in FIGS. 1-4, with the flap 28 extending out from the upper portion of the thickness of the body 20 into covering relation with the base plate opening 12, the compression of the body 20 accomplished by the action of the screws 42 will bias the flap 28 upwardly against the under surface of the base plate 8 so as normally to cover and close the base plate opening 12.

If now the piston 4 is raised in the direction of the arrow 58 of FIG. 1, the pre-loading of the flap 28 will ensure that no air can enter the cylinder 2 via the slots 42 and 32 and the opening 12. The only air which can enter the cylinder 2 (assuming that the cylinder 2 and base plate 8 are properly sealed and that the piston 4 is in effective sealing engagement with the inner surface of the cylinder 2) is along the path defined by the space between the wings 56 of the washer 50 and the under surface of the bracket wall 36, the clearance between the screw 46 and the aperture 44 in the bracket wall 36, the slot 26 in the member 20, and the aperture 10 in the base plate 8, all as indicated by the broken lines 60 in FIGS. 2 and 4. The degree to which the screw 46 is threaded into the base plate 8 will control the effective size of this path by controlling the spacing between the washer wings 56 and the bracket wall 36. In this way the flow of air in the cylinder 2 when the piston 4 is raised may be adjusted and hence the degree of resistance to the lifting of the piston 4 (i.e. the damping effect) can be controlled. If the piston 4 is lowered in the direction of the arrow 62 of FIG. 1, it will force air to move ahead of it and this air will pass through the base plate opening 12 and move the flap 12 to its broken line position shown in FIG. 2, thus opening the aperture 12 and permitting air to pass out freely from the cylinder 2 via the aperture 12, the slot 32 and the slot 42.

If damping is desired only for the opposite direction of movement of the piston 4 the construction shown in FIG. 7 is used. There the base plate 8' is provided with an aperture 12' which is larger than the flap 28, the bracket wall 36' is provided with an aperture 42' which is smaller than the flap 28 and is adapted to be covered and closed thereby, and the member 20 is turned upside down when compared to its orientation of the embodiment of FIGS. 1-4 so that the flap 28 extends out from the lower portion of the thickness of the member 20. Compression of the body of the member 20 will then cause the flap 28 to be biased or pre-loaded downwardly against the bracket wall 36', thus closing and sealing the opening 42' and preventing the escape of air through the apertures 12' and 42' from the very moment that the piston 4 commences to move downward. Air will then only be able to escape along the path indicated by the broken lines 60 in FIGS. 2 and 4, the damping adjustment structure being identical in the embodiment of FIG. 7 with that of the other figures. When the piston 4 is raised air will flow upwardly through the aperture 42', it will lift the flap 28', and will freely enter the cylinder 2 via the aperture 12'.

It is noteworthy that with this construction none of the parts except the interior of the cylinder 2 and the exterior of the piston 4 need be made to precise tolerances. Indeed a great latitude in dimensions is permissible without affecting the functioning of the assembled device. The base plate 8, the member 20 and the bracket 34 are all readily susceptible of inexpensive quantity manufacture, and the necessity for costly and time consuming machining operations is virtually, if not completely, eliminated. Once the cylinder 2 has been sealed to the base plate 8 the assembly of the structure is almost the ultimate in simplicity. The member 20 is sandwiched between the base plate 8 and the bracket 34, the parts are put together through the use of two screws 42, the washer 50 is placed against the head 48 of the screw 46, and the screw 46 is screwed into the base plate aperture 14. The device is then ready for use.

While but a limited number of embodiments of the present invention have been here specifically disclosed it will be apparent that many variations may be made in the details, all within the scope of the present invention as defined in the following claims.

I claim:

1. In combination, a cylinder with a piston movable therein, said cylinder having a closed end comprising a wall with a fluid passage aperture therethrough, a member positioned against said wall and having a movable flap of lesser thickness than said member proper overlying and normally completely covering said aperture and movable to a position uncovering said aperture, and means for compressing said member proper adjacent said flap in a direction substantially perpendicular to the normal direction in which said flap extends while leaving said flap free to move, thereby biasing said flap relative to said aperture.

2. The combination of claim 1, in which said flap is completely surrounded by the body of said member with appreciable clearance therebetween at the sides and free end of said flap.

3. In the combination of claim 1, said wall having a second fluid passage aperture therethrough, a screw adjustably threaded in said wall and passing through said second aperture with clearance, the head of said screw projecting beyond and normally spaced from the outer surface of said wall, and a resilient member between said screw head and said outer wall surface, a fluid passage from said second aperture to the exterior of said combination being defined at least in part by said resilient member, movement of said screw head toward said wall compressing said resilient member and thereby closing off said last mentioned fluid passage.

4. In combination a cylinder with a piston movable therein, said cylinder having a closed end comprising a wall with a fluid passage aperture therethrough, a member positioned against said wall and having a movable flap of lesser thickness than said member proper integral with said member proper and overlying and normally completely covering said aperture and movable to a position uncovering said aperture, and means for compressing said member proper adjacent said flap in a direction substantially perpendicular to the normal direction in which said flap extends while leaving said flap free to move, thereby biasing said flap relative to said aperture.

5. The combination of claim 4, in which said flap is completely surrounded by the body of said member with appreciable clearance therebetween at the sides and free end of said flap.

6. In combination, a cylinder with a piston movable therein, said cylinder having an inner wall part closing one end thereof, an outer wall part to which said inner wall part is secured, a member interposed between said inner and outer wall parts, said inner and outer wall parts and said member each having a communicating set of fluid passage apertures therethrough, said member having a movable flap of lesser thickness than said member proper overlying and normally completely covering said aperture in one of said walls and movable to a position uncovering said aperture, and means for compressing said member proper adjacent said flap in a direction substantially perpendicular to the normal direction in which said flap extends while leaving said flap free to move, thereby biasing said flap relative to said aperture.

7. The combination of claim 6, in which said flap is completely surrounded by the body of said member with appreciable clearance therebetween at the sides and free end of said flap.

8. In the combination of claim 6, said inner and outer walls and said member having a second communicating set of fluid passage apertures therethrough, a screw adjustably threaded in said first wall part and passing through the aperture of said second set in said second wall part with clearance, the head of said screw projecting beyond and normally spaced from the outer surface of said second wall part, a resilient member between said screw head and said outer surface of said second wall part, a fluid passage from said aperture of said second set in said second wall part to the exterior of said combination being defined at least in part by said resilient member, movement of said screw head toward said second wall part compressing said resilient member and thereby closing off said last mentioned fluid passage.

9. In combination, a cylinder with a piston movable therein, said cylinder having an inner wall part closing one end thereof, an outer wall part to which said inner wall part is secured, a member interposed between said inner and outer wall parts, said inner and outer wall parts and said member each having communicating fluid passage apertures therethrough, said member having a movable flap of lesser thickness than said member proper integral with said member proper and overlying and normally completely covering one of said apertures in one of said walls and movable to a position uncovering said aperture, and means for compressing said member proper adjacent said flap in a direction substantially perpendicular to the normal direction in which said flap extends while leaving said flap free to move, thereby biasing said flap relative to said aperture.

10. The combination of claim 9, in which said flap is completely surrounded by the body of said member with appreciable clearance therebetween at the sides and free end of said flap.

11. In combination, a cylinder with a piston movable therein, said cylinder having a closed end comprising a wall with a pair of fluid passage apertures therethrough, a check valve in one of said apertures, a screw adjustably threaded in said wall and passing through the other of said apertures with clearance, the head of said screw projecting beyond and normally spaced from the outer surface of said wall, and a resilient member between said screw head and said outer wall surface, said member being bowed so that portions thereof engage said outer surface of said wall and other portions thereof engage said screw head and are spaced from said outer surface of said wall, a fluid passage from said other aperture to the exterior of said combination being defined at least in part by said resilient member, movement of said screw head toward said wall moving said other portions of said member toward said outer surface of said wall and thereby closing off said last mentioned fluid passage.

12. In combination, a cylinder with a piston movable therein, said cylinder having an inner wall part closing one end thereof, an outer wall part to which said inner wall part is secured, said inner and outer wall parts having a pair of registering fluid passage apertures therethrough, a check valve in one of said pair of apertures, a screw adjustably threaded in said inner wall part and passing through the other of said apertures in said outer wall part with clearance, the head of said screw projecting beyond and normally spaced from the outer surface of said outer wall part, a resilient member between said screw head and said outer surface of said outer wall part, a fluid passage from said other aperture to the exterior of said combination being defined at least in part by said resilient member, movement of said screw head toward said outer wall part compressing said resilient member and thereby closing off said last mentioned fluid passage.

13. In combination, a cylinder with a piston movable therein, said cylinder having an inner wall part closing one end thereof, an outer wall part to which said inner wall part is secured, said inner and outer wall parts having a pair of registering fluid passage apertures therethrough, a check valve in one of said pair of apertures, a screw adjustably threaded in said inner wall part and passing through the other of said apertures in said outer wall part with clearance, the head of said screw projecting beyond and normally spaced from the outer surface of said outer wall part, a resilient member between said screw head and said outer surface of said outer wall part, said member being bowed so that portions thereof engage said outer surface of said wall part and other portions thereof engage said screw head and are spaced from said outer surface of said outer wall part, a fluid passage from said other aperture to the exterior of said combination being defined at least in part by said resilient member, movement of said screw head toward said outer wall part moving said other portions of said member toward said outer surface of said outer wall part and thereby closing off said last mentioned fluid passage.

References Cited in the file of this patent

UNITED STATES PATENTS

| 703,468 | Quimby | July 1, 1902 |
| 881,227 | Dodge | Mar. 10, 1908 |
| 1,869,752 | Jakosky et al. | Aug. 2, 1932 |
| 2,019,747 | Taylor | Nov. 5, 1935 |
| 2,077,295 | Whitney | Apr. 13, 1937 |
| 2,689,916 | Lohman et al. | Sept. 21, 1954 |
| 2,722,896 | Hayes | Nov. 8, 1955 |
| 2,893,682 | Hintzman et al. | July 7, 1959 |
| 2,941,544 | Peras | June 21, 1960 |

OTHER REFERENCES

Voigt et al.: German application 1,021,218 printed December 19, 1957, Kl. 479, 3 pages specification; 1 sheet drawings.